United States Patent [19]

Oexler et al.

[11] 4,383,406
[45] May 17, 1983

[54] APPARATUS FOR SEALING A ROTOR HOUSING OF AN OPEN-END SPINNING MACHINE

[75] Inventors: Rudolf Oexler; Eberhard Grimm, both of Ingolstadt, Fed. Rep. of Germany

[73] Assignee: Schubert & Salzer Maschinenfabrik Aktiengesellschaft, Ingolstadt, Fed. Rep. of Germany

[21] Appl. No.: 266,760

[22] Filed: May 22, 1981

[30] Foreign Application Priority Data

May 31, 1980 [DE] Fed. Rep. of Germany ....... 3020725

[51] Int. Cl.³ ............................................. D01H 7/882
[52] U.S. Cl. ......................................... 57/406; 57/415
[58] Field of Search .................. 57/406, 411, 414, 415

[56] References Cited

U.S. PATENT DOCUMENTS

| | | | |
|---|---|---|---|
| 3,837,154 | 9/1974 | Stahlecker | 57/406 |
| 3,911,659 | 10/1975 | Mandl | 57/406 |
| 4,077,195 | 3/1978 | Stahlecker et al. | 57/415 |
| 4,116,505 | 9/1978 | Stahlecker | 57/406 |
| 4,254,614 | 3/1981 | Miyamoto et al. | 57/406 |
| 4,261,165 | 4/1981 | Burgermeister et al. | 57/406 |

*Primary Examiner*—John Petrakes
*Attorney, Agent, or Firm*—Julian W. Dority

[57] ABSTRACT

Apparatus for sealing a rotor housing of an open-end spinning machine is disclosed wherein the housing is under a reduced-pressure and includes a bore through which a rotor shaft of the spinning rotor extends. The apparatus includes a mounting carried by the rotor housing for floatingly mounting a sealing washer relative to the bore of the housing and a counter-surface carried adjacent the reduced-pressure side of the housing against which the sealing washer is abutted and maintained by the reduced pressure in the housing.

8 Claims, 5 Drawing Figures

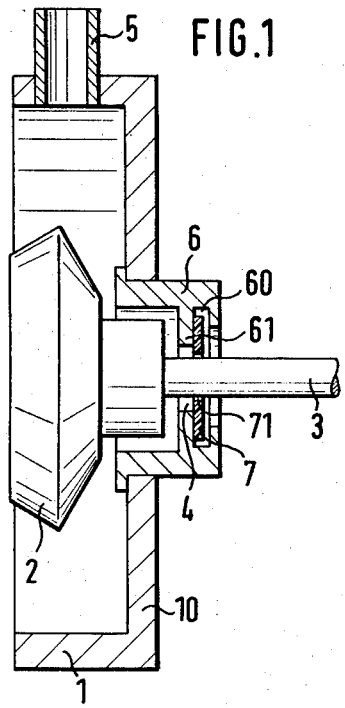
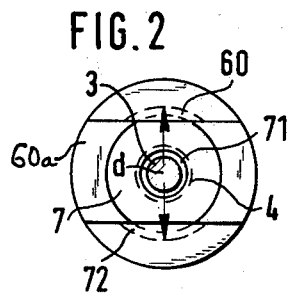
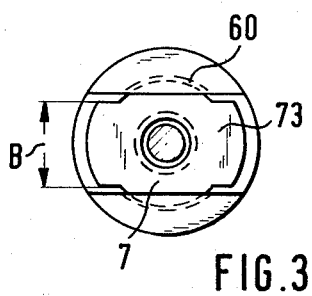
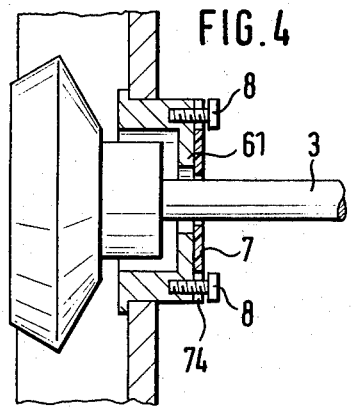
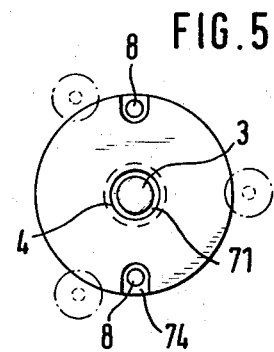

APPARATUS FOR SEALING A ROTOR HOUSING OF AN OPEN-END SPINNING MACHINE

BACKGROUND OF THE INVENTION

The invention relates to the housing of an open-end spinning machine and more particularly to the sealing of the shaft of the spinning rotor thereof. In order to prevent penetration of air into a rotor housing, which is under reduced pressure during spinning, it has already been proposed to provide air damming spaces between a bore located in a rear wall of the rotor housing for passage of the rotor shaft and an annular collar of the shaft, and additionally to fasten a sealing washer to these means within the rotor housing. The washer has an opening through which the rotor extends which is smaller in diameter than the diameter of the bore. The section of the rotor shaft upon which the washer is carried is smaller than the annular collar (DE OS No. 2,424,919).

Disadvantages of this solution are firstly that the sealing washer only effects a seal in combination with special rotor shafts with annular collars, and its application is thereby restricted, quite apart from the associated cost. The use of annular collars necessitates, apart from this, an increase in the distance between the rotor and the mounting for the rotor shaft (not shown). Any unbalance can hence be amplified and act on the mounting, stressing it unduly. The combination of a rotor shaft with an annular collar and a sealing washer, necessary for sealing, furthermore leads to an increased cost when the spinning rotor is changed, since either the sealing washer is withdrawn with the rotor shaft from the rotor housing and then either has to be separated from the rotor shaft and inserted into the housing, or special means have to be provided for enlarging the passage opening in order to be able to draw the annular collar through this opening.

SUMMARY OF THE INVENTION

The object of the present invention is to provide an apparatus, avoiding the above-mentioned disadvantages, and making possible in a simple manner, a satisfactory seal of a bore through which a rotor shaft extends.

This object is achieved according to the invention in that a sealing washer is floatingly mounted relative to the bore and a counter-surface is provided on the reduced pressure side which abuts against the sealing washer.

Hence, the sealing washer is fixed relative to the counter-surface by the reduced pressure present in the rotor housing which causes the washer to be pressed against the counter-surface. The sealing washer is automatically centered by the rotating rotor shaft. Since the sealing washer can follow changed positions of the rotor shaft, for example, due to wear of the supporting ring when a support ring bearing is used, or on lifting the rotor shaft out of the bearing for braking purposes, it is further possible to keep its passage opening for the rotor shaft very small, so that an optimal sealing effect results. Further advantages attained by the mounting of the sealing washer according to the invention are shown in the description.

The invention is described below with reference to the drawings.

BRIEF DESCRIPTION OF THE DRAWINGS

FIG. 1 a rotor housing with a sealing washer according to the invention, in longitudinal section,
FIG. 2 a view of the sealing washer and its mounting from FIG. 1,
FIG. 3 another embodiment of the sealing washer,
FIG. 4 a further kind of mounting of the sealing washer,
FIG. 5 a view of the sealing washer and its mounting from FIG. 4.

DESCRIPTION OF A PREFERRED EMBODIMENT

According to FIG. 1, a spinning rotor 2 of an open-end spinning machine revolves in a rotor housing 1, and its smooth rotor shaft 3 passes out of the rotor housing 1 through a bore 4 and is mounted outside the rotor housing 1 in a mounting which is not shown. A support disk forming a wedge gap, or any other known mounting, can be provided as the mounting for the rotor shaft 3. To produce a reduced pressure in the rotor housing 1, a suction duct 5 connected to a suction apparatus (not shown) opens into the rotor housing 1, which is closed on its open side by a cover (not shown). The bore 4 is located in an insert 6 which is releasably fastened in the rear wall 10 of the rotor housing. However, in appropriate circumstances, the bore 4 can also be provided in a rear wall constructed in one piece.

A sealing washer 7 is mounted in a groove 60 adjacent the bore 4 outside the rotor housing 1. One side of the groove is defined by a counter-surface 61 which is a wall located on the reduced-pressure side of the sealing washer 7 and is abutted by the sealing washer during operation, as will be described. The sealing washer has a passage opening 71 for the rotor shaft 3, the diameter of which is only a little larger, for example, 3/10 mm larger, than the diameter of the rotor shaft 3.

As is evident from FIG. 2, the groove 60 includes upper and lower partial circular portions shown in dotted line in FIG. 2, which generally match the contour of the sealing washer in the example of the circular sealing washer 7. Here the diameter d of a circle formed by the two partial circles of groove 60 is greater than the diameter of the sealing washer 7, so that the sealing washer 7 is guided perpendicularly to the longitudinal axis of the rotor shaft 3, with play in the groove 60. Since the thickness of the sealing washer 7 is smaller than the depth of the groove 60, and the sealing washer thus also has play in the direction of the longitudinal axis of the rotor shaft 3, means for a floating mounting of the sealing washer 7 in the groove 60 relative to bore 4 is provided. The sealing washer 7, which appropriately consists of an elastic plastics, can be inserted into the groove 60 from the slotted side 60a.

During operation, in which a reduced pressure is present in the rotor housing 1, the sealing washer is pressed by the reduced pressure onto the wall, forming the counter-surface 61 of the groove 60, and is centered by the rotating rotor shaft 3, so that the passage opening 71 of the sealing washer lies centrally of the longitudinal axis of the rotor shaft 3. Thus, optimum sealing of the bore 4 is simply achieved, the distance between the rotor 3 and the rotor shaft mounting, and thus the influence on the mounting of an existing unbalance, remaining small. On a change of the spinning rotor 2 which may be required, the rotor shaft 3 can be withdrawn from the system in the usual manner. Since the sealing washer 7, because of its floating mounting, has the ability to follow the lifting-out motion of the rotor shaft, the sealing washer does not hinder the lifting out of the rotor shaft.

In the embodiment shown in FIG. 3, the sealing washer 7 is provided with lug-like projections 73 which form a securement against rotation. Since the width B of the projections 73 is smaller than the width of the releasing slot of groove 60, restricted rotations are possible for the sealing washer, so that its floating mounting is insured. Turning of the sealing washer 7 with the rotating rotor shaft 3 when no reduced pressure is present in the rotor housing 1, for example when the cover is opened, and a resulting possible wear of the sealing washer 7, are thus prevented.

FIGS. 4 and 5 show a further preferred possibility for floating mounting of the sealing washer outside the rotor housing 1. The sealing washer is here held by screws 8 which can be inserted or screwed into the rear wall of the insert 6 or even be made integral with the wall.

The screws 8 extend through cut-outs 74 of the sealing washer 7 formed as slotted holes, and have a smaller diameter than the slotted holes. Here heads on the screws 8, which are larger than cut-out 74 and are spaced from the sealing washer 7, prevent the sealing washer from falling out of its mounting. In this arrangement, the sealing washer 7 also has play in the direction of the longitudinal axis of the rotor shaft as well as transverse thereto, and is secured against rotating with the rotor shaft when there is no reduced pressure. Instead of slotted holes, circular holes with correspondingly larger diameter can be provided in the sealing washer for the screw 8 to be passed through. Likewise, there exists the possibility of distributing screws over the periphery of the sealing washer, as indicated in FIG. 5, and in appropriate circumstances to provide additional projections at the periphery of the sealing washer to strike against the bolts and thus prevent rotation of the sealing washer.

When in operation, a reduced pressure is present in the rotor housing 1, the sealing washer 7 abuts against the counter-surface 61 present on its reduced-pressure side, and is held, centered by the rotor shaft, in a fixed position against this surface 61.

The invention has been described with reference to a circular sealing washer. However, the sealing washer can also have another shape, for example, an angular one, in which case the floating mounting can analogously be carried out. The possibility likewise exists of mounting the sealing washer 7 floatingly inside the rotor housing, in which case, a circular insert can be provided in the rotor housing as the counter-surface against which the sealing washer abuts as a result of the reduced pressure.

What is claimed is:

1. Apparatus for sealing a bore of a rotor housing of an open-end spinning machine which housing is under reduced pressure and through which a rotor shaft extends and is mounted with a sealing washer which has a passage opening for the rotor shaft, said rotor shaft is smaller in diameter than the diameter of the bore, said apparatus comprising:

mounting means carried by said housing for floatingly mounting said sealing washer relative to said bore; and a counter-surface carried adjacent said reduced-pressure side of said housing abutted by said sealing washer which is maintained thereagainst by said reduced pressure in said housing.

2. Apparatus according to claim 1 wherein said sealing washer is rotatable to a limited extent in said mounting means.

3. Apparatus according to claim 1 including a groove slotted on one side in which said sealing washer is carried and is guided with play transversely to and in the direction of a longitudinal axis of said rotor shaft.

4. Apparatus according to claim 3, including lug-like projections present on said sealing washer as securements against rotation, said projections having a width which is smaller than the width of said groove slot.

5. Apparatus according to claim 1, wherein said sealing washer is floatingly held by screws.

6. Apparatus according to claim 5, characterized in that said screws are received in cut-out openings formed in said sealing washer, said openings having a diameter greater than that of said screws.

7. Apparatus according to claim 1 wherein said sealing washer consists of an elastic plastics.

8. Apparatus according to claim 1 wherein said sealing washer is mounted on the rear wall of an insert, said bore being formed in said insert.

* * * * *